(12) United States Patent
Ulrich et al.

(10) Patent No.: US 9,318,884 B2
(45) Date of Patent: Apr. 19, 2016

(54) INDUCTION HEATING WIRE INSULATION HEATING AND REMOVAL

(75) Inventors: Mark Andrew Ulrich, New London, WI (US); Michael Allen Sammons, Appleton, WI (US); Ryan Jerome Lindeman, Suamico, WI (US); Nicholas James Dessart, Appleton, WI (US); Brian Anthony Schwartz, Appleton, WI (US); Warren Edward Herwig, Oshkosh, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1041 days.

(21) Appl. No.: 13/432,750

(22) Filed: Mar. 28, 2012

(65) Prior Publication Data
US 2012/0248093 A1    Oct. 4, 2012

Related U.S. Application Data

(60) Provisional application No. 61/469,455, filed on Mar. 30, 2011.

(51) Int. Cl.
| H05B 6/02 | (2006.01) |
| H05B 6/10 | (2006.01) |
| H02G 1/12 | (2006.01) |
| H05B 6/14 | (2006.01) |

(52) U.S. Cl.
CPC .............. *H02G 1/128* (2013.01); *H05B 6/105* (2013.01); *H05B 6/14* (2013.01)

(58) Field of Classification Search
CPC ........... H02G 1/128; H05B 6/14; H05B 6/105
USPC ......... 219/600, 635, 636, 605, 615, 628, 643, 219/659, 637; 315/274; 81/9.4; 29/860, 29/866; 439/398, 847
See application file for complete search history.

(56) References Cited

U.S. PATENT DOCUMENTS

| 3,467,806 | A | * | 9/1969 | Dixon | 219/659 |
| 5,412,184 | A | * | 5/1995 | McGaffigan | 219/643 |
| 5,832,790 | A | | 11/1998 | Lostumo et al. | |
| 2006/0290295 | A1 | * | 12/2006 | Yang et al. | 315/274 |

FOREIGN PATENT DOCUMENTS

DE   10 2008 043 876 A1   5/2010

OTHER PUBLICATIONS

International Search Report & Written Opinion of PCT/US2012/031274 dated Apr. 19, 2013.

* cited by examiner

*Primary Examiner* — Quang Van
(74) *Attorney, Agent, or Firm* — Fletcher Yoder P.C.

(57) ABSTRACT

This disclosure relates generally to removing wire insulation. In an embodiment, a system for heating and removal of wire insulation includes a power supply configured to receive input power and to provide a high frequency power output to an induction coil. The induction coil is to be coupled to the power supply and dimensioned to receive an insulated wire therethrough. The induction coil is also to produce a field based upon the high frequency power output to heat the wire by induction and to condition insulation disposed on an outer surface of the wire for removal.

15 Claims, 3 Drawing Sheets

INDUCTION HEATING WIRE INSULATION HEATING AND REMOVAL

CROSS REFERENCE TO RELATED APPLICATION

This application claims the benefit of U.S. Provisional Patent Application No. 61/469,455, entitled "Wire Insulation Stripping and Removal Using an Induction Heating System", filed on Mar. 30, 2011, which is herein incorporated by reference in its entirety.

BACKGROUND

The invention relates generally to removing wire insulation, and more specifically, to removing wire insulation via heating.

Conductive wire is used in a variety of applications in various industries. For example, conductive wire may be used to transmit electric current, electrically couple electronic devices, transmit information between devices, generate an electromagnetic field, or generate heat. Some conductive wire may be insulated to shield the conductive wire from the environment. For example, insulation may shield a conductive wire carrying a high current from an environment to reduce transmission losses and to permit handling of the conductive wire. Insulation may surround a conductive wire along its length to protect the conductive wire from environmental conditions such as corrosion, electromagnetic fields, extreme temperatures, abrasion, and friction. Insulation may also prevent unintentional grounding of the conductive wire. Various types of materials such as polymers, coatings, enamels, and textiles may be used to insulate conductive wire.

Some insulation may be removed from a conductive wire to couple an insulated wire with one or more devices to transmit electric current or information. Traditional methods for removing insulation may include rotary wire brushes, mechanical grinding, flame removal, chemical etching, solder pot stripping, and laser removal. However, some traditional methods may remove some of the conductive wire along with the insulation or may have undesirable effects on the conductive wire. Some methods may produce an undesirable work environment. Insulation may be difficult to remove due to insulation properties. For example, some insulation may withstand temperatures as high as 250 degrees Celsius. Additionally, some methods may require systems that cannot be relocated easily.

BRIEF DESCRIPTION

In one embodiment, a system for heating and removal of wire insulation includes a power supply configured to receive input power and to provide a high frequency power output to an induction coil. The induction coil is designed to be coupled to the power supply and dimensioned to receive an insulated wire therethrough. The induction coil is configured to produce a field based upon the high frequency power output to heat the wire by induction and to condition insulation disposed on an outer surface of the wire for removal.

In another embodiment, a system for heating and removal of wire insulation includes a power supply configured to receive input power and to provide a high frequency power output to a hand-held induction coil assembly. The hand-held induction coil assembly is configured to be coupled to the power supply and dimensioned to receive an insulated wire therethrough. The hand-held induction coil assembly also includes a trigger to control production of a field based upon the high frequency power output to heat the wire by induction and to condition insulation disposed on the outer surface of the wire for removal.

In another embodiment, a method for removal of insulation from an insulated wire includes positioning an induction coil about a portion of the wire from which insulation is to be removed, and producing a high frequency induction field via the coil to heat the wire to condition insulation disposed on an outer surface of the wire for removal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As described in detail below, provided herein are embodiments of induction heating systems to condition insulation of an insulated wire for removal. The induction heating system includes an induction coil configured to receive a high frequency power output from a power supply to produce a field about the induction coil. A portion of an insulated wired disposed in the field is heated such that the insulation on the portion of the insulated wire may be easily removed after exposure to the field. The power supply may include power conversion circuitry to produce alternating current output. An impedance matching transformer may receive the alternating current output and produce the high frequency power output. Control circuitry within the power supply regulates operation of the power supply and control the power output to produce a field by the induction coil. Control circuitry may adjust the power output and produced field based at least in part on operator input, such as the diameter, gauge, and type of insulate wire to be at least partially stripped. For example, upon actuation of a trigger the control circuitry may produce a field for a predetermined time to condition the insulation without affecting the conductive wire. In some embodiments, the induction coil may be removably connected to the power supply. The induction coil may be configured for hand-held operation. In some embodiments, the induction coil may condition the insulation for removal without contact between the induction coil and the insulated wire. In some embodiments, the induction coil may be a flexible conduit that may be directly coiled about various sizes of insulated wire. The induction coil may be a fluid (e.g., water) cooled Litz wire, where fluid from fluid circulation circuitry of the power supply is to circulate through the induction coil. Furthermore, the induction coil may be a part of an induction coil assembly that includes a brushing, wiping, or spray structure to remove insulation conditioned by the induction coil. The foregoing features may offer distinct advantages over systems that remove insulation without induction heating. For example, presently disclosed embodiments may provide an improved outer surface of the conductive wire. The embodiments may also be readily portable due to a removable connection to a power supply and/or hand-held operation of the induction coil. These embodiments may also provide for insulation removal without risks associated with flames, solder pots, or chemicals.

Figure 1:
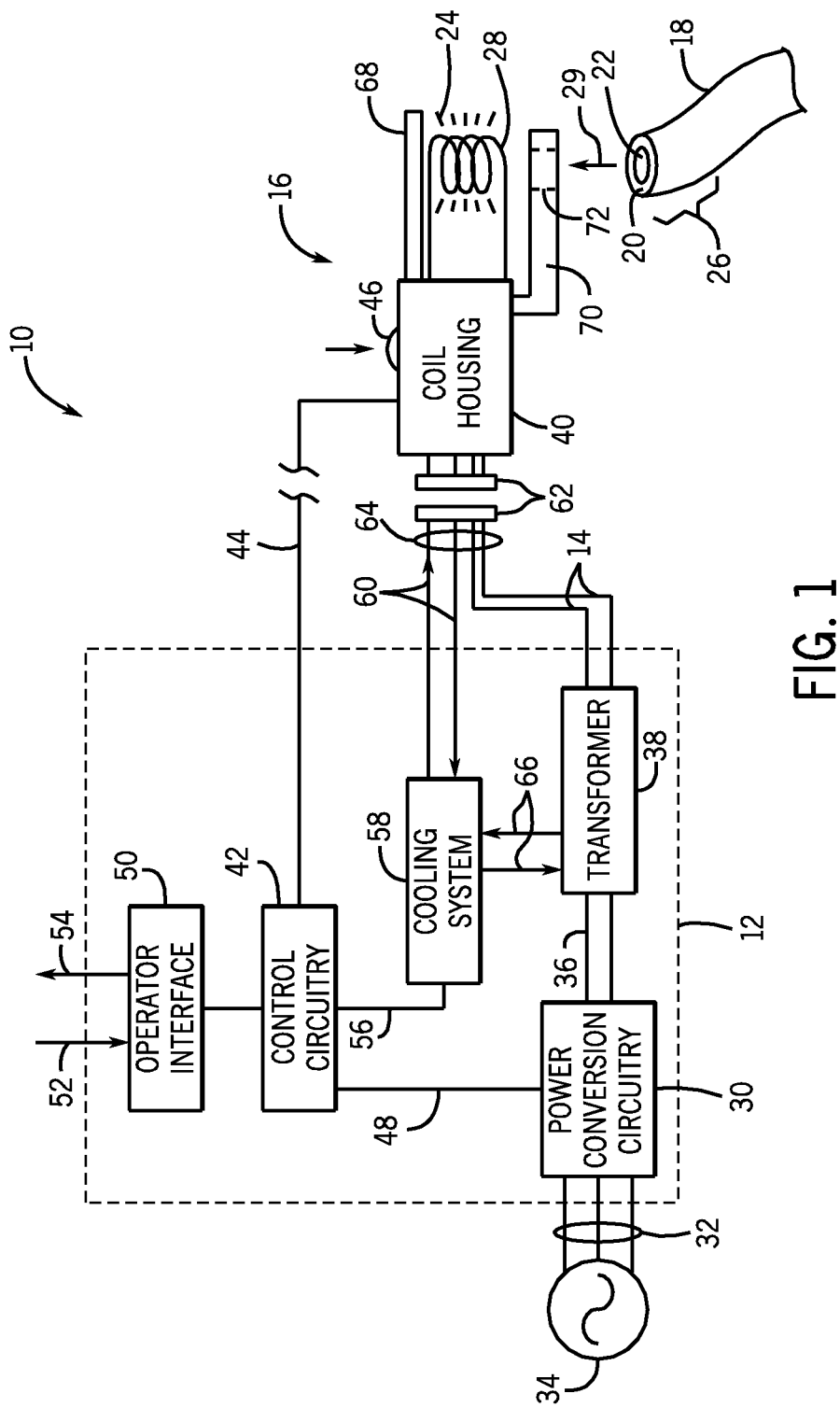
FIG. 1 is a block diagram of an induction heating system having a power supply and an induction coil in accordance with aspects of the present disclosure.

Turning now to the drawings, FIG. 1 illustrates an embodiment of an induction heating system 10 adapted to condition insulation from an insulated wire via induction heating. The induction heating system 10 includes a power supply 12 that supplies a power output 14 to an induction coil 16. The power output 14 is a high frequency alternating current power output designed to produce a field. The induction coil 16 is be dimensioned to receive an insulated wire 18. The insulated wire 18 includes an outer layer of insulation 20 disposed about a conductive wire 22. The insulated wire 18 may be any type of wire, including but not limited to solid wire (e.g., magnet wire) and stranded wire. Furthermore, the insulation 20 may include layers of varnishes, films, coatings, wraps, textiles or enamels disposed about the wire 22. For example, insulation 20 may include fiberglass, rubber, textile, or polymer (e.g., polyurethane, polyamide, polyester, polyimide) layers to shield the wire 22 from the environment. In some embodiments, the wire 22 may be composed of copper, aluminum, iron, silver, platinum, gold, and alloys thereof.

Upon receiving the power output 14, the induction coil 16 produces a field 24 (e.g., electromagnetic field). In a presently contemplated embodiment, an insulated wire portion 26 may be inserted through at least part of the coil element 28 of the induction coil 16 in the direction shown by arrow 29. Within the coil element 28, the insulated wire portion 26 is subject to the field 24. The field 24 heats the wire 22 at least within the wire portion 26 by induction heating. As will be appreciated by those skilled in the art, induction heating is a phenomenon that occurs when conductive materials are within a changing magnetic or electromagnetic field.

The power output to the induction coil 16 produces a field 24 in the coil element 28. The field 24 heats the insulated wire 18, particularly the outer surface of the wire 22, by induction heating. By heating the outer surface of the wire 22, the insulation 20 disposed about the wire 22 at the outer surface is conditioned for removal by heating, generally due to conductive heat transfer. Insulation 20 conditioned for removal may be heated, melted, charred, evaporated, expanded, and combinations thereof based at least in part on heating parameters. The duration, power, frequency, and other heating parameters may vary based at least in part on the gauge of insulated wire 18, thickness of insulation 20, insulation material, wire material, size of the wire portion 26, among other factors.

Embodiments of the power supply 12 may include power conversion circuitry 30 configured to receive a power input 32 (e.g., alternating current) from a power source 34. The power source 34 may supply an alternating current to the power supply 12 as single or multi-phase input. Alternatively, the power source 34 may provide a direct current power input 32, and the power conversion circuitry 30 may include an inverter or any suitable power conversion circuitry to produce an alternating current. The power input 32 may have a first frequency (e.g., 60 Hz). The power conversion circuitry 30 may increase the frequency of the power input 32 to produce an alternating current output 36 of a second frequency (e.g., 20 kHz). For example, the power conversion circuitry 30 may increase the frequency of the power input 32 so that the alternating current output 36 is between approximately 5 kHz to 60 kHz, approximately 7 kHz to 50 kHz, or approximately 10 kHz to 40 kHz. The alternating current output 36 may have any suitable waveform, such as a sine wave, a square wave, a triangle wave, a sawtooth wave, and so forth. A transformer 38 between the power conversion circuitry 36 and coil assembly 40 transmits the power of the alternating current output 36 along to the power output 14 while changing the voltage and current transmitted to the induction coil. The transformer steps up one of the voltage or current and inversely steps down the other of voltage or current. For example, a 4:1 transformer may step down the voltage by a factor of 4 and increase the current by a factor of 4, while negligibly affecting the power transmitted. An impedance matching transformer may be configured to increase the efficiency of power transmitted to the power output 14 by reducing losses due to mismatched impedance of the power supply 12 relative to the induction coil 16. The transformer 38 is utilized to increase the magnitude of the current change within the coil due to the alternating current, and thus increase the magnetic field produced by the induction coil 16 and the heat induced in the insulated wire 18. The transformer 38 is also utilized to better match the impedance of the induction coil 16 to the power supply 12.

Control circuitry 42 within the power supply 12 provides for control of the induction heating system 10. The control circuitry 42 is coupled to the induction coil 16 within the coil assembly 40 via a control line 44. In some embodiments, the induction coil 16 may be configured for hand-held operation. For example, the coil assembly 40 may include a handle and may be readily portable by an operator without the use of additional equipment. The coil assembly 40 may have a trigger 46, switch, button, or other input device configured to transmit a signal via the control line 44 to the control circuitry 42. The control circuitry 42 controls the activation of induction coil 16 through the control line 44 and/or through the control line 48 coupling the power conversion circuitry 30 to the control circuitry 42. For example, actuation of the trigger 46 initiates production of the field 24 by controlling the current in the power supply 12 or induction coil 16. In some embodiments, the control circuitry 42 directs power output through the induction coil 16 to produce the field 24 while the trigger 46 is actuated. In other embodiments, the trigger 46 actuates a momentary contact switch, and the field 24 is produced for a predetermined time after actuation of the trigger. For example, trigger 46 actuation may produce the field 24 for approximately up to 1, 2, 3, 4, 5, 10, or 15 seconds. Thus, the induction coil 16 may quickly condition the insulation 20 for removal. For example, the induction coil 16 may raise the temperature of the insulated wire 18 by 25, 50, 100, 150, 200, 250, 300, 400, 500 degrees Celsius or more.

The control circuitry 42 may be powered at least in part by the power conversion circuitry 30. The control circuitry 42 adjusts the frequency, current, voltage, power, duration and other operating parameters of the alternating current output 36 produced by the power conversion circuitry 30. An operator interface 50 of the power supply 12 provides for operator input 52 to adjust the settings of the power conversion circuitry 30. For example, the operator interface 50 may be configured to permit operator input 52 of at least one heating parameter. The operator interface 50 may have a plurality of controls (e.g., knobs, dials, buttons, switches, and sliders) to receive operator input 52. Additionally, the operator interface 50 produces outputs 54 to alert the operator to the condition and state of the power supply 12 and induction coil 16. For example, the operator interface 50 includes a display to indicate the power, current, and/or voltage of the power input 32, the alternating current output 36, or the power output 14. The operator interface 50 may also indicate a duration of a produced field, the temperature of the induction coil 16 or insulated wire 18, whether the coil assembly 40 is coupled to the power supply 12, and/or whether a cooling system 58 is operational, among other properties pertaining to the status and operation of the power supply 12 and induction coil 16. The operator interface 50 may be on the power supply 12 or remotely coupled to the power supply. For example, the operator interface 50 may be a remote device coupled to the power supply 12 by a wired or wireless connection.

The power supply 12 may have a cooling system 58 to regulate operation of the transformer 38 and/or the induction coil 16. For example, the cooling system 58 cools the induction coil 16 to provide for sustained production of a field 24 and/or a high current through the coil element 28. Control circuitry 42 controls the cooling system 58 via the control line 56. The cooling system 58 directs a cooling fluid to the induction coil 16 through a first cooling conduit 60. During production of the field 24, the induction coil 16 becomes warm due to the current passing through the coil element 28 and/or due to radiation from the induction heated insulated wire 18. Only the insulated wire 18 may increase significantly in temperature during operation and production of the field 24. The first cooling conduit 60 may be removably coupled to the coil assembly 40 and induction coil by a coupling 62. The power output 14 and first cooling conduit 60 together may be part of an input conduit 64 that may be removably coupled by the coupling 62 to the coil assembly 40. For example, the input conduit 64 includes a water cooled conductive wire (e.g., Litz wire) to transmit the power output 14 to the induction coil 16. The control line 44 may also be a part of the input conduit 64 removably coupled to the coil assembly 40. Alternatively, the power output 14, control line 44, and first cooling conduit 60 are separately coupled to the induction coil 16 and coil assembly 40. The cooling system 58 may also direct a cooling fluid to the transformer 38 through a second cooling conduit 66. The cooling fluid controlled by the cooling system 58 may include air, water, refrigerant (e.g., ammonia, R-134a, R-410a). The cooling system 58 circulates the cooling fluid through the induction coil 16 and transformer 38 as shown by the return arrows of the first 60 and second 66 fluid conduits. The cooling system 58 may cool both the induction coil 16 and transformer 38 through a common cooling loop that includes the first fluid conduit 60 and second fluid conduit 66. Alternatively, each may be cooled separately through the respective first 60 and second 66 cooling conduits. The control circuitry 42 may control the induction heating system 10 so that the induction coil 16 will not produce a field 24 unless the cooling system 58 is cooling the induction coil 16 and/or the transformer 38.

The induction heating system 10 may be utilized to remove or strip the insulation 20 from many types of insulated wire 18. The induction heating system 10 conditions the insulation 20 of wiring to expose the portion 26 of the conductive wire 22 for a sound electrical connection. In some embodiments, insulation 20 at an end of the insulated wire 18 may be conditioned for removal so that the conductive wire may be soldered, brazed, inserted, wound, or otherwise electrically coupled to a surface. The induction heating system 10 may condition for removal the insulation 20 on a wire to be used in electrical circuitry. The removal technique is particularly useful for insulations that are particularly difficult to remove, such as on magnet wire. Such wire may be used, for example, in transformers, electric motors and other machines.

In a presently contemplated arrangement, the induction heating system 10 is utilized to remove insulation 20 from insulated wires 18 without transporting the insulated wire 18 to a special location for insulation 20 removal. The induction heating system 10 may be a small, portable system that may readily be moved to a work area by an operator. For example, the induction heating system 10 may include only a power supply 12 and an induction coil 16 within a coil assembly 40 configured for hand-held operation. At the work area, the operator conditions and removes the insulation 20 from the wire portion 26 using the induction heating system 10. An embodiment of the induction heating system 10 may include a power conversion circuitry 30 such as the Miller IHPS II, the Miller Induction Heating Pendant controller, a step down transformer, a Miller Coolmate water cooler, and a Litz wire coil. The water cooler may be configured to cool both the transformer and Litz wire coil. The Miller IHPS II, Miller Induction Heating Pendant controller, and Miller Coolmate may all be supplied by Miller Electric Manufacturing Company of Appleton, Wis.

As mentioned above, in one particularly useful application, the insulation of magnet wire may be conditioned for removal by the induction heating system 10. Magnet wire is used for magnetic devices such as transformer, inductors, motors, and electromagnets among other devices. Magnet wire is commonly a solid metal (e.g., copper, aluminum, silver) conductive wire of a round or square shape. Frequently, magnet wire may be wrapped around a core to form a winding, such as in a transformer or electric motor. Magnet wire may be coated with one or more enamel or polymer layers. The insulation may extend along the length of the magnet wire, including up to the ends of the conductive wire. In some situations, only the insulation at the ends of the magnet wire may be conditioned for removal so that the magnet wire may be electrically coupled to a terminal, circuit, or other electronic device. For conditioning of insulation about a consistently sized wire portion 26, some embodiments of the coil assembly 40 may include a stop 68 for limiting insertion of the insulated wire 18 through the induction coil 16. For example, the stop 68 may provide for substantially consistent conditioning of the last 0.5 inches to 1 inch, or approximately 0.75 inches of the insulation 20. Alternative embodiments may provide for conditioning of the insulation 20 of differently sized wire portion 26. The stop 68 may be adjusted to change the size of the wire portion 26 to be conditioned by the induction coil 16. Furthermore, the induction coil 16 may include an open coil so that the insulation 20 may be removed from a wire portion 26 along the length of the insulated wire 18, not just at the end of the insulated wire 18.

The control circuitry 42 may provide for a programmability of the induction heating system 10. Through the operator interface 50, the operator may adjust the heating parameters of the power supply 12 to affect the field produced by the induction coil 16 and the heating of the wire 18. Heating parameters include the current, voltage, power, frequency, duration of the field 24 and temperature of the insulated wire 18. In some embodiments, the control circuitry 42 has a memory for storing computer readable instructions and a processor for processing the instructions. For example, the operator inputs 52 the type or gauge of wire to be stripped. Upon actuation of the trigger 46, the control circuitry 42 causes the induction coil 16 to produce a field 24 of a predetermined frequency and intensity for a predetermined time to condition the insulation 20 for removal. In some embodiments, the operator inputs and adjusts heating parameters for various diameters, lengths of the wire portion 26, and types of insulated wire 18. These adjusted or programmed heating parameters may be stored in memory. For example, the operator may adjust the heating parameters based at least in part on the type of insulation and gauge of magnet wire. The operator may also adjust the heating parameters based on the manufacturer of the magnet wire.

The coil assembly 40 may include one or more peripheral structures 70, such as the stop 68. The stop 68 may be a part of the induction coil 16 as described below. A fixture for holding the wire 18 in place may be another peripheral structure. The wire 18 may be inserted through or supported by the fixture for the conditioning process. The peripheral structures may include a wiping structure 72 configured to remove (e.g., strip) the insulation 20 from the wire surface after the insulation has been conditioned. The wiping structure 72 may include a brush, cloth, air curtain, air vortex, air jet, water jet, or any other suitable contact or non-contact component. The wiping structure 72 may be a part of the fixture for holding the wire, or alternatively may be a separate peripheral structure 70. The wiping structure 72 may be disposed within the coil assembly 40 such that when the wire 18 is removed from the induction coil 16, the wiping structure 72 may be configured to remove the conditioned insulation. The wiping structure 72 may be a passive structure disposed adjacent the coil element 28 and configured to receive the wire 18. For example, as illustrated in FIG. 1, the wire 18 may be inserted in direction 29 through the brushes of the wiping structure 72 before disposition within the induction coil 16. After the insulation is conditioned, the brushes remove the insulation 20 from the outer surface of the wire 22 when the insulated wire 18 is removed. The wiping structure 72 may include a fluid jet to remove insulation 20 after conditioning by the induction coil 16. The fluid jet may be air, water, or another fluid. The fluid jet may be controlled by the control circuitry 42 so that the fluid jet removes the insulation 20 when the wire 18 is removed from the induction coil. 16. In some embodiments, the fluid jet may be actuated by a trigger 46.

Figure 2:
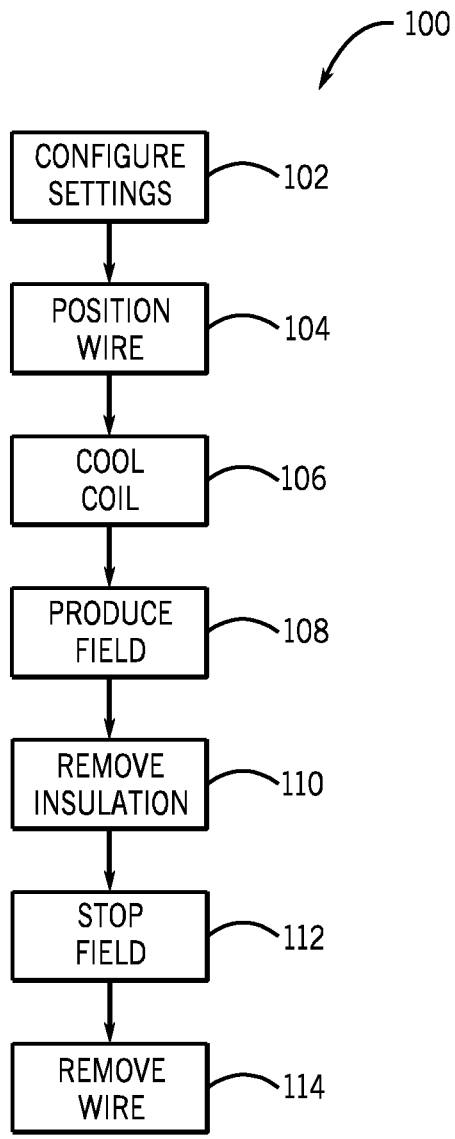
FIG. 2 is a flow chart of an embodiment of a method for removing insulation from an insulated wire in accordance with aspects of the present disclosure.

The induction heating system of FIG. 1 may be utilized according to the method 100 illustrated in FIG. 2. The first step of the method 100 is to configure the settings of the power supply 12 and induction coil 16 based on the insulated wire 18 and desired heating parameters, as indicated by reference numeral 102. The amount of heat to be used to properly condition the insulation for removal may vary among types and thicknesses of insulation, as well as the type and gauge of conductive wire. Additionally, the size of the wire portion to be conditioned may also affect the heating parameters. The heating parameters may be configured through the operator interface of the power supply as described above. In some situations, configuration of the settings before each use may not be appropriate or necessary, such as when conditioning the same sized wire portion of multiple wires. Once the heating parameters are satisfactory for the desired application, the wire may be positioned within the induction coil, as indicated at step 104. Alternatively, the wire may be positioned outside the induction coil such that it may be inductively heated by the field produced by the induction coil in the next step. The power supply may cool the induction coil, as indicated generally at step 106. A cooling system of the power supply may cool the induction coil and/or the transformer before and during the production of the field. Then, at step 108, the power supply may produce a field in the induction coil, causing the field to inductively heat the wire and condition the insulation as described above. Current passing through the induction coil and transformer may warm due to resistance heating. In some embodiments, the power supply may not produce the field in the induction coil unless the power supply is cooling the induction coil. The field may be actuated by a trigger and, where desired the field may be produced for predetermined time according to the previously configured heating parameters.

As shown at step 110, the conditioned insulation may be removed from the outer surface of the conductive wire during production of the field. This may reduce the probability of the conditioned insulation reattaching to the wire portion. In step 112, the power supply may stop the field to halt the conditioning of the insulation about the wire. The field may be stopped due to production for a predetermined time or release of the trigger as described above. After the field has been stopped, the insulation may be conditioned for removal. The wire may be removed from the induction coil, as indicated by reference numeral 114. In some embodiments, the conditioned insulation may also be removed as shown at step 110 after the field has been stopped or after the wire has been removed from the induction coil. For example, removing the wire from the induction coil may move the wire through a wiping structure to remove conditioned insulation.

Alternatively, some of the steps described may be omitted or performed in a different order. For example, the induction heating system may produce a field about the induction coil before the insulated wire is positioned in the induction coil. The insulated wire may be dispersed in the field produced by the coil for a sufficient time to condition the insulation. After the sufficient time has lapsed, the wire may be removed from the field without stopping the field. As another example, the power supply may cool the coil after initiating production of the field. The conditioned insulation may not be removed until after the wire has been removed from the induction coil.

Figure 3:
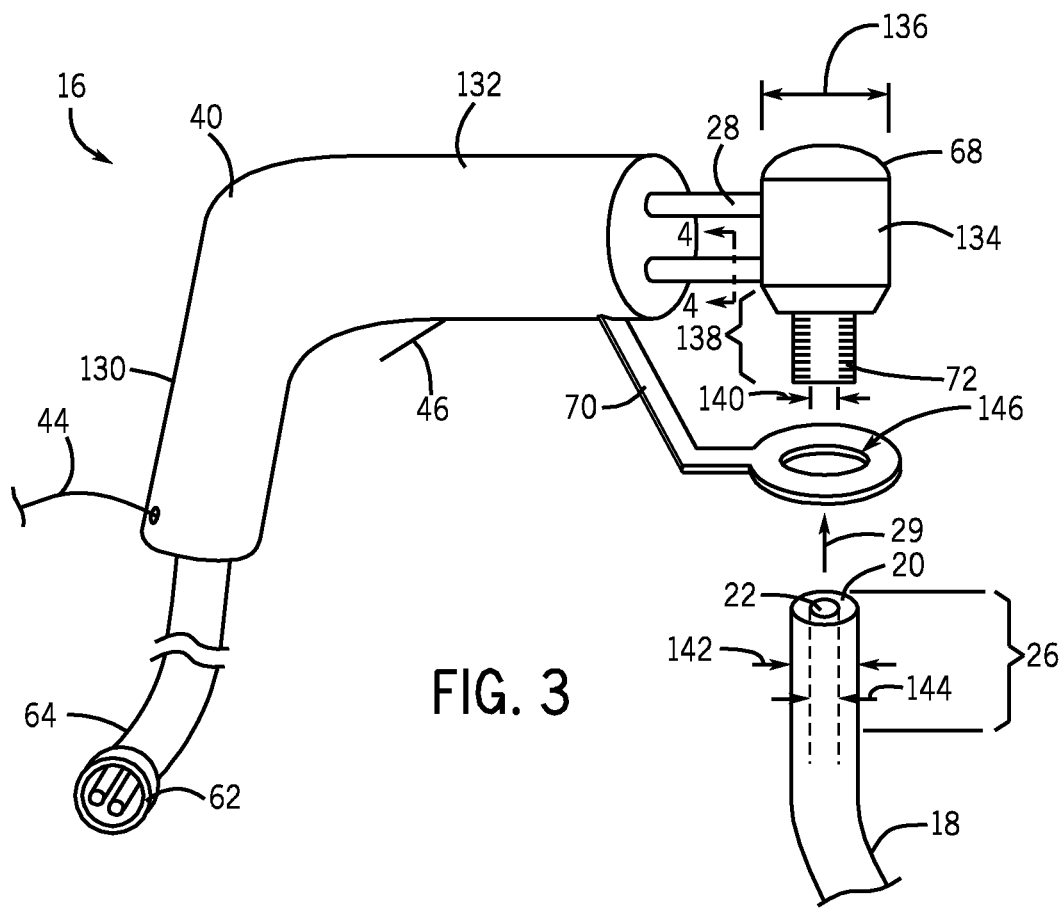
FIG. 3 is a hand-held induction coil assembly and a stop for limiting a position of an insulated wire through the induction coil in accordance with aspects of the present disclosure.

FIG. 3 illustrates a hand-held embodiment of an induction coil 16 having a coil assembly 40 with a handle 130. The coil assembly 40 may be configured for hand-held operation with the handle 130 and trigger 46 disposed on the body 132. Other embodiments may include only a body 132 and trigger 46. The coil element 28 may extend from the body 132 to receive the wire 18. As illustrated, an embodiment of the induction coil 16 may include a receiver portion 134. The receiver portion 134 shown has a stop 68 as described above. In some embodiments, the receiver portion 134 may be cup-shaped with a diameter 136. The diameter 136 may be greater than the outer diameter 142 of the insulated wire 18. The receiver portion 134 is configured to receive the wire 18 through a neck 138 at an end opposite the stop 68. The neck 138 may include a wiping structure 72 discussed above, such as brushes. The neck 138 may have a smaller diameter 140 than the outer diameter 142; however, the wiping structure 72 may be configured to permit passage of the insulated wire 18 through the neck 138. For example, the brushes may bend to receive the insulated wire 18. The neck diameter 140 may be narrower than the wire diameter 144 so that the wiping structure 72 removes the conditioned insulation from the outer surface of the wire 22 along the wire portion 26. The wiping structure 72 is configured to remove the heated insulation that may be conditioned by charring, melting or expansion. The wiping structure 72 may be configured to be cleaned and/or replaced.

The induction coil 16 may include a peripheral structure 70 such as a support fixture as described above and illustrated in FIG. 3. The support fixture may have an opening with a diameter 146 larger than the outer diameter 142. This peripheral structure 70 may be configured to receive the insulated wire 18 and support the wire while the insulation 20 is conditioned for removal.

The induction coil 16 receives power to produce the field 24 through the input conduit 64. As discussed above, the input conduit 64 may include the power output and cooling conduit, and may be removably coupled to the power supply by a coupling 62. The induction coil 16 may be removed and switched with a different induction coil. For example, the different induction coil may be configured to condition a larger insulated wire 18. Furthermore, the induction coil 16 is coupled to the control circuitry of the power supply through the control line 44. The control line 44 may be within the input conduit 64. The input conduit 64 may pass through the handle 130 and body 132 of the coil assembly 40 to couple with the coil element 28. The cooling conduit within the input conduit 64 may circulate cooling fluid through the coil element 28. As discussed above, the coil element 28 may have a solid wire, hollow wire, or a plurality of stranded wires (e.g., Litz wire). The wire within the coil element 28 may be arranged in a coil configured to carry the high frequency power output and produce a field (e.g., magnetic field). The field 24 may be strongest within the coil. The coil may be a helical shape, or may be wrapped about a cylinder, torus, or other shape configured to produce a field that induces heat within an insulated wire 18. The coil element 28 may have a fixed shape. For example, the coil element 28 may be arranged in a helical coil within the receiver portion 134.

Figure 4:
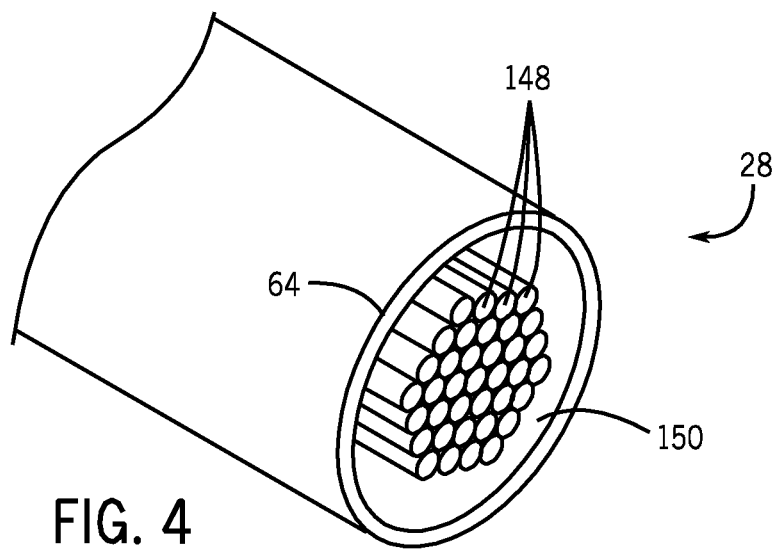
FIG. 4 is a cross-section of a fluid cooled induction coil in accordance with aspects of the present disclosure.

The coil element 28 may also be flexible to readily accommodate different gauges and lengths of insulated wire to be conditioned. As illustrated in FIG. 4, the coil element 28 may be the input conduit 64 disposed about stranded wire 148 (e.g., Litz wire) and a passage 150. The passage 150 may be annular. Litz wire may be used to decrease the skin effect and reduce the heat and power loss through the coil element 28. The cooling fluid directed through the annular passage 150 cools the stranded wire 148 to dissipate heat and reduce power loss through the coil element 28. The stranded wire 148 provides for increased flexibility of the coil element 28. The operator may coil the flexible coil element 28 around the insulated wire 18. The operator may manually wrap the coil element 28 around the wire portion 26 of the insulated wire 18. This may improve the positioning of the coil element 28 about the insulated wire 18 and provide for enhanced control of the conditioning of the insulation 20.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for heating and removal of wire insulation, comprising:
a power supply configured to receive input power and to provide a high frequency power output; and
an induction coil configured to be coupled to the power supply and to receive the high frequency power output, the induction coil being dimensioned to receive an end portion of an insulated wire therethrough, to produce a field based upon the high frequency power output to heat the insulated wire by induction, and to condition insulation disposed on an outer surface of the insulated wire for removal, wherein the induction coil comprises a stop configured to interface with an axial end of the insulated wire to position the end portion within the induction coil.

2. The system of claim 1, wherein the power supply comprises power conversion circuitry configured to produce an alternating current output, and an impedance matching transformer coupled to receive the alternating current output and to produce the high frequency power output at a current suitable for the induction coil.

3. The system of claim 2, wherein the power supply comprises cooling fluid circulation circuitry configured to circulate cooling fluid through the induction coil and the impedance matching transformer.

4. The system of claim 1, wherein the power supply comprises control circuitry configured to regulate operation of the power supply.

5. The system of claim 1, wherein the power supply comprises an operator interface coupled to control circuitry and configured to permit operator input of at least one heating parameter.

6. The system of claim 1, wherein the power supply is removably connected to the induction coil.

7. The system of claim 1, wherein the induction coil is configured for hand-held operation.

8. The system of claim 7, wherein the induction coil comprises a trigger for initiating production of the field when actuated by an operator.

9. The system of claim 8, wherein the trigger actuates a momentary contact switch, and the field is produced for a predetermined time after actuation of the trigger.

10. The system of claim 1, wherein the induction coil comprises a conductor disposed in a flexible conduit configured to receive a cooling fluid during operation.

11. The system of claim 1, wherein the induction coil is provided in an assembly that includes a brushing or wiping structure to remove insulation from the insulated wire after heating.

12. The system of claim 1, wherein the end portion comprises 1 inch or less of the insulated wire adjacent to the axial end.

13. The system of claim 1, wherein the high frequency power output is produced in a range of from about 5 kHz to about 50 kHz.

14. A system for heating and removal of wire insulation, comprising:
a power supply configured to receive input power and to provide a high frequency power output; and
a hand-held induction coil assembly configured to be coupled to the power supply and to receive the high frequency power output, the hand-held induction coil assembly being dimensioned to receive an end portion of an insulated wire therethrough, the hand-held induction coil assembly comprising a trigger to control production of a field based upon the high frequency power output to heat the insulated wire by induction and to condition insulation disposed on an outer surface of the insulated wire for removal and a stop configured to interface with an axial end of the insulated wire to position the end portion within the hand-held induction coil assembly.

15. The system of claim 14, wherein the power supply comprises power conversion circuitry configured to produce an alternating current output, an impedance matching transformer coupled to receive the alternating current output and to produce the high frequency power output at a current suitable for the hand-held induction coil assembly, cooling fluid circulation circuitry configured to circulate cooling fluid through the hand-held induction coil assembly, and control circuitry configured to regulate operation of the power supply.

* * * * *